United States Patent [19]

Bonzom et al.

[11] 4,276,246

[45] Jun. 30, 1981

[54] PROCESS FOR PREPARING PITCH FOAMS AND PRODUCTS SO PRODUCED

[75] Inventors: Albert Bonzom, Sausset-les-Pins; Alain P. Crepaux, Lavera; Anne-Marie E. J. Moutard, Paris, all of France

[73] Assignee: The British Petroleum Company Limited, London, England

[21] Appl. No.: 967,594

[22] Filed: Dec. 8, 1978

[30] Foreign Application Priority Data

Dec. 14, 1977 [FR] France .................. 77 37747
Dec. 14, 1977 [FR] France .................. 77 37748

[51] Int. Cl.$^3$ ............................................. B29D 27/00
[52] U.S. Cl. ........................................ 264/53; 208/22; 208/39; 264/29.1; 264/54; 264/DIG. 5; 423/445; 423/448; 423/449
[58] Field of Search ............... 423/445, 448, 449; 264/29.1, 41, 51, 53, 54, 55; 208/22, 39; 106/122; 252/62

[56] References Cited

U.S. PATENT DOCUMENTS

| | | | |
|---|---|---|---|
| 1,915,940 | 6/1933 | McKee | 106/122 |
| 2,763,897 | 9/1956 | Gates et al. | 264/55 |
| 2,876,126 | 3/1959 | Sommer | 106/122 X |
| 2,901,369 | 8/1959 | Pordes | 106/122 |
| 3,121,050 | 2/1964 | Ford | 423/448 |
| 3,160,689 | 12/1964 | Brunner | 264/54 |
| 3,302,999 | 2/1967 | Mitchell | 423/448 |
| 3,342,555 | 9/1967 | McMillan | 423/449 |
| 3,353,978 | 11/1967 | Davie | 106/122 X |
| 4,060,578 | 11/1977 | Kisbany | 264/55 |

FOREIGN PATENT DOCUMENTS

| | | | |
|---|---|---|---|
| 1086373 | 8/1960 | Fed. Rep. of Germany | 208/22 |
| 1292318 | 10/1972 | United Kingdom . | |
| 1325916 | 8/1973 | United Kingdom . | |
| 1408154 | 10/1975 | United Kingdom . | |
| 1413550 | 12/1975 | United Kingdom . | |

*Primary Examiner*—Edward J. Meros
*Attorney, Agent, or Firm*—Morgan, Finnegan, Pine, Foley & Lee

[57] ABSTRACT

In a process for the manufacture of pitch foams in which pitches are expanded at elevated temperature by a porogenic agent in a mould, the pitch has a KS softening point of from 70° to 210° C. The initial pressure is such that, at the decomposition temperature of the porogenic agent, the external pressure is higher than the pressure which would normally exist within the pitch at the temperature of operation. After the decomposition of the porogenic agent the pressure is lowered to expand the pitch. The temperature may also be adjusted between the decomposition and decompression stages.

These pitch foams can be used as floor coverings, as insulators or as surfaces for the collection of solar energy.

Certain foams may be converted to carbon and graphite foams by a process of oxidation to render their surface infusible followed by carbonisation and, if desired, graphitisation.

The carbon foams can be used as thermal insulation, as catalyst supports or as filters for corrosive products.

5 Claims, 1 Drawing Figure

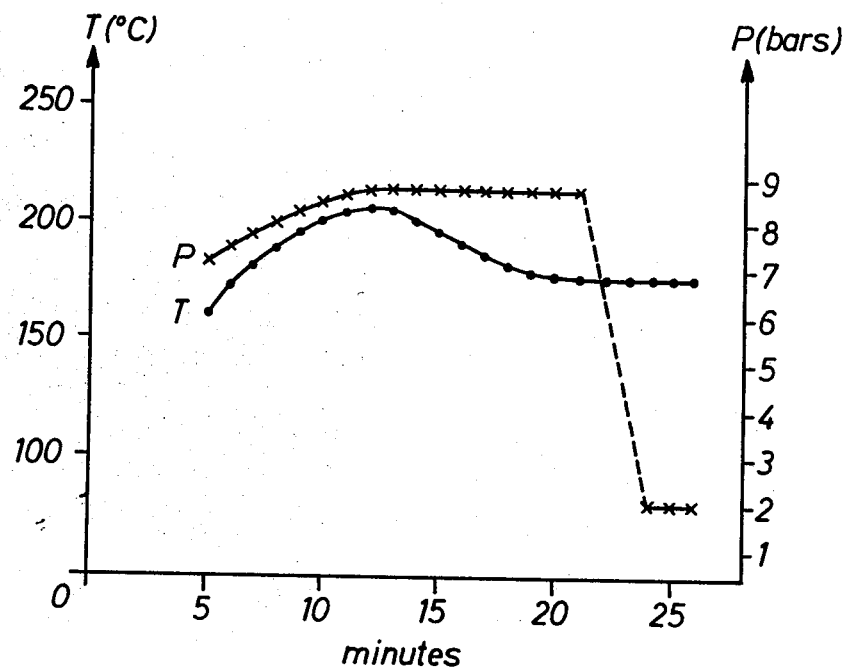

PROCESS FOR PREPARING PITCH FOAMS AND PRODUCTS SO PRODUCED

The present invention relates to a process for the manufacture of pitch foams, particularly petroleum pitch foams, and to products resulting from this process. The invention includes the subsequent conversion of the pitch foams to carbon and graphite foams and to the products resulting therefrom.

The porosity of pitch foams may be of two types, viz: open porosity when the cavities of the foam are connected to one another, and closed porosity when the cavities are isolated within the mass.

The determination of the percentage of porosity is generally carried out with reference to the density of the bodies. Thus, the following densities may be determined:

(a) the apparent density (ad) by weighing a given volume of sample (NFT method 56 107), (b) the real density (rd) by pyknometric methods on product which has been crushed and screened to eliminate the pores (NFT method 66014), and (c) the pyknometric density (pd) determined by a pyknometric method on the product as it is after boiling for 8 hours in water.

In this way it is possible to establish the porosity percentages by the folowing equations:

% total porosity: $(1-ad/rd) \times 100$
% open porosity: $(1-ad/pd) \times 100$
% closed porosity: $(1/pd-1/rd) \times ad \times 100$ The percentage of total porosity must naturally be equal to the sum of the percentage of open porosity and the percentage of closed porosity. It is obvious that for a product of a given real density (rd) the greater the decrease in the apparent density the greater the percentage of total porosity (open and/or closed).

A certain number of processes for the manufacture of foams from bituminous derivatives are already known. However, existing products have insufficient shape stability under normal conditions of use and have a comparatively poor strength.

For this reason, these materials have been used in combination with thermohardening resins, e.g. styrene-butadiene copolymers, with phenols such as novolaks, or with mixtures of polyols and diisocyanates so as to promote polymerisation and cross-linking in the system.

The Applicants have now discovered a process for the manufacture of foams from pitches which, contrary to existing processes, gives pitch foams having satisfactory properties of mechanical strength and porosity.

They have further discovered that the foams thus prepared may be suitable for the manufacture of carbon foams and graphite foams.

The process according to the invention consists in carrying out an expansion of the pitch under conditions of pressure and temperature such as to avoid the occlusion of the cavities. It has the advantage of being flexible to the extent that the same porogenous agent may be used for pitches having variable Kraemer-Sarnow (KS) softening points. Foams with variable degrees of porosity and given dimensions may thus be obtained without any difficulty.

The invention therefore relates to a process for the preparation of pitch foams and the foams obtained thereby.

According to the present invention a process for the production of pitch foams in which a pitch is expanded at elevated temperature in a mould by means of a porogenic agent is characterised in that the pitch has a Kraemer-Sarnow (KS) softening point of from 70° to 210° C., that the initial pressure is such that the applied external pressure is higher than the internal pressure which would normally exist within the pitch at the temperature of operation and that, after the decomposition of the porogenic agent, the pressure is lowered to expand the pitch.

The initial pressure applied to the mixture of pitch and porogenic agent, hereinafter referred to as the decomposition pressure, is preferably between about 1 and 10 bars depending on the nature of the porogenic agent and the quantity employed.

The decompression pressure is, as indicated above, lower than the pressure initially applied to the system and depends on the inital conditions on the one hand, and on the nature of the foam desired (open or closed porosity) on the other. The decompression pressure is preferably chosen so that the product exactly fills the mould at the decompression temperature. If the pressure is too low, excessively large cavities may be formed. If the pressure is too high, the product is not completely expanded and the products have a high closed porosity relative to the open porosity. This pressure is preferably between 0 and 2 bars according to the initial pressure applied to the system. The pressure should be low to produce foams having a high percentage of open porosity (higher than 75%).

The decomposition temperature may vary with the porogenic agent used and is preferably between 120° and 210° C. The duration of decomposition depends on the temperature and is, desirably, sufficiently long to bring about a total decomposition of the porogenic agent. The decompression temperature may be equal to, higher than or lower than the decomposition temperature, the difference being between 5° and 50° C. and it may also vary with the nature of the porogenic agent used.

The principle behind choosing the decompression temperature is to strike a balance so that the pitch is sufficiently viscous to retain its structure, yet sufficiently fluid to be expanded. The ideal rheological behaviour is of the thixotropic type. In addition to temperature, the rheological behaviour may also be modified by additives such as bentonite or talc. The decompression temperature is preferably between 110° and 220° C.

The pitches used are desirably pitches possessing high softening points and containing little volatile product. They are, preferably, pitches having a KS softening point of between 90° and 210° C.

The pitches may have viscosities of from 10 to 50,000 pascal seconds (Pa.s) and, in particular, of 1,000 to 10,000 Pa.s during the decomposition of the porogenic agent and viscosities of 1,000 and 10,000 Pa.s and, in particular, of 1,800 to 5,000 Pa.s during decompression.

The pitches used may be pitches from steam cracking residues, thermal or catalytic cracking residues, asphalt pitches, pitches from distillation residues of petroleum products, coal tar pitches, extract pitches and mixtures thereof.

Preferred pitches are those prepared by the process described in the Applicant's French Pat. Nos. 73.40152, 75.29794 and 77.00103. These patents describe a process in which a residue from the steam cracking of a petroleum fraction is subjected to a distillation followed by a themal ageing.

This process consists, in particular, in distilling a steam cracking residue derived from a petroleum fraction, particularly a naphtha fraction, until the pitch reaches a softening point of between 55° and 90° C., and then ageing the pitch until it reaches a softening point of between 85° and 110° C., the temperature being preferably between 350° and 450° C. If the pitch thus obtained still contains volatile products, these can be eliminated by subsequent thermal treatments under comparatively mild conditions.

As will be described in more detail hereafter, the pitches derived from steam cracking residues preferably have particular properties, if the pitch foam is subsequently to be converted to carbon or graphite foam.

The porogenic agents used in the expansion phase may be chosen so that their decomposition temperatures correspond with the temperatures at which the pitch is suitably softened, so that the decomposition reaction releases a large quantity of gas. Clearly, also, the agents and their decomposition products should be inert to the pitch, non-toxic and non-corrosive to the mould or the operating machine. Such porogenic agents are known in the art.

Suitable porogenic agents for use in the present invention include:
p,p'-oxybisbenzenesulphonylhydrazide,
azodicarbonamide (or azobisformamide),
azo-1,1'-cyano-1-cyclohexane,
azobisisobutyronitrile,
diazoaminobenzene,
N,N'-dimethyl-N,N'-dinitrosoterephthalimide,
N,N'-dinitrosopentamethylenetetramine,
benzenesulphonyl hydrazide,
4-toluenesulphonyl hydrazide,
diphenylsulphone-3,3'-disulphonyl hydrazide,
benzene-1,3-disulphonyl hydrazide,
p-toluenesulphonyl semicarbazide,
5-phenyl tetrazole,
diphenoxy-4,4-disulpho hydrazide,
trihydrazinotriazine,
sodium bicarbonate,
pentane, the chlorinated and/or fluorinated derivatives of methane such as those sold under the Trade Mark Freon by Du Pont de Nemours, water in the form of steam.

The porogenic agents particularly preferred according to the invention are p,p'-oxybisbenzenesulphonyl-hydrazide, azodicarbonamide, azo-1,1'-cyano-1-cyclohexane (sold under the designations $OP_1$, AZM2S, AZCC respectively by the Societe Francaise d'Organo Synthese) as well as the product sold under the name BZM by the same company and which contains azodicarbonamide and an accelerator.

Some of the agents mentioned above produce gases by actual decomposition and some by simple vaporisation. It is to be understood that the term "decomposition" as used in the present specification refers to the formation of gas by either mechanism.

The porogenic agent is preferably used in quantities of from 1 to 10% by weight of the pitch.

In addition to the porogenic agent, other additives may be used, if desired, such as accelerators known under the name of "Kickers", e.g. zinc salts, substituted ureas, polyols or amines and also additives which modify the rheological behaviour of the pitch, e.g. "bentonite" or talc. The additives may be used in an amount of 1 to 10% by weight.

The mixture of pitch, porogenic agent and, possibly, additives is expanded to give pitch foam of low density, e.g. between about 0.05 and 0.6, and preferably from 0.1 to 0.4. According to a preferred embodiment, it has a high open porosity, preferably greater than 75%.

The mould used during the preparation of the pitch foams according to the invention is preferably coated with a fluorocarbon product to facilitate mould release.

The pitch foams thus obtained which also form part of the present invention are characterised by the fact that they have an apparent density of between 0.05 and 0.60 and preferably of from 0.1 to 0.4 and an open porosity percentage greater than 75%.

The pitch foams may be used, as such, as coatings, soil aerators, humidity regulators, insulators in the building industry, particularly as heat and sound insulators or, finally, as surfaces for the collection of solar energy.

As previously mentioned pitch foams can be used, in particular, for the manufacture of carbon or graphite foams.

Carbon and graphite foams have been obtained hitherto by the carbonisation of foams of plastic materials (thermoplastic or thermohardening), e.g. phenolic resins or polyurethanes.

For example, syntactic foams have been obtained by moulding a mixture of hollow microspheres with a binder followed by carbonisation as described in French Pat. Nos. 2,110,123 and 2,143,957; such products have a closed porosity of more than 90%. A process for the preparation of carbon foam from polyurethanes is described in French Pat. No. 2,242,331 and a process starting from phenolic foams is described in U.S. Pat. No. 3,121,050.

Because of the fairly high cost price and the low carbonisation yield of plastics, replacing a part of these materials with petroleum products such as bitumens, pitches and distillation residues has also been proposed. Such a process is described in French Pat. No. 2,063,648 using a mixture of coal tar pitch and novolak resin.

The carbon and graphite foams obtained according to the processes of prior art using at least one plastic material possess certain drawbacks, viz: the high cost price, the relatively low yield of carbon foam and the friable character and low mechanical strength of the foams obtained.

Attempts at the manufacture of carbon and graphite foams solely from pitches or bitumen have hitherto been unsuccessful, largely due to the loss of plasticity and dimensional stability at the temperatures normally employed for the manufacture of carbon and graphite foams.

In this further embodiment of the invention the Applicants have discovered a process for the preparation of carbon and graphite foams using as initial material pitch foams without the addition of plastic materials which overcomes the above mentioned drawbacks.

In particular they have found that an oxidation of pitch foams followed by carbonisation and possibly graphitisation gives carbon or graphite foams which possess mechanical properties which are superior to those which it was possible to obtain by the use of plastic materials. The use of these pitch foams under the conditions of the Invention also makes it possible to improve the yield of carbon of graphite foam and to lower their cost price.

The use of pitch foams according to the Invention also possesses the advantage of being more flexible in that one can obtain foams with a variable degree of porosity and prepare objects of any given dimensions without difficulty.

For the production of carbon and graphite foams from pitch foams, prepared as previously described, it is preferable to select pitches of a certain quality and to carry out the foam formation under selected conditions.

Thus, the pitch may be derived from a steam cracking residue, asphalt, or coal tar, or mixtures thereof. It is preferably derived from a steam cracking residue according to the previously mentioned French Pat. Nos. 73.40152, 75.29794 and 77.00103.

In particular, the Kraemer Sarnow (KS) softening point is desirably between 150° and 210° C., this being achieved by suitable control of the ageing and by elimination of volatile products during or after the ageing. Preferably also the resin content of the pitch is controlled by control of the ageing and/or by subsequent treatments.

For the purposes of the present Invention, the proportion of $\beta$ resins or resins insoluble in benzene or toluene (which is directly related to the Conradson carbon content determined by the NFT method 60116) should be moderately high so as to ensure a good rigidity of the structure during the subsequent thermal treatment on the one hand, and to ensure the production of foams in good yield and with good mechanical properties on the other.

Pitches of petroleum origin and particularly those prepared by the process described in the Applicant's French Pat. No. 73.40152, should therefore be treated as necessary, so that they have a $\beta$ resin content of from 5 to 40% more particularly from 10 to 30%. The pitches may be modified by a supplementary thermal treatment which increases their Kraemer-Sarnow softening point (determined by NFT method 6700 1) whilst avoiding a greater condensation of the resins. The thermal treatment makes it possible to concentrate $\beta$ resins in the pitch and eliminate a part of the light products such as the $\delta$ resins (which are resins soluble in n-hexane, benzene and toluene) and which can be deleterious to the subsequent thermal treatments.

The thermal treatment, in effect, removes a part of the volatile products which are liable to cause occlusion of the pores when they are vaporised during the various subsequent thermal treatments. It may be carried out in a number of different ways.

Thus, it is possible to continue the thermal ageing mentioned above until a pitch possessing the required softening point and resin content is obtained.

An alternative treatment is stripping using an inert gas such as nitrogen or argon at temperatures lower than 350° C. and preferably at a temperature lower than 300° C. The temperature is kept low to avoid the additional formation of more highly condensed resins.

Another thermal treatment may be distillation in vacuo at a pressure less than 5 to 10 mm of mercury and at a temperature below 350° C.

The thermal treatment eliminates a part of the volatile products. The net result is a shortening of the distribution curve of number molecular weights ($\overline{Mn}$), without increasing appreciably the average molecular mass by weight ($\overline{Mw}$).

Since the thermal treatment is carried out at a temperature lower than the cracking temperature of the heavier molecules in the pitch there is no risk in the formation of additional products of low molecular mass or recondensation of the molecules during the treatment.

The pitches thus obtained are particularly suitable for the preparation of foams to be subsequently carbonised. In addition to having the preferred content of $\beta$ resins mentioned above they also, desirably, have KS softening points between 150° and 250° C. and more particularly between 180° and 250° C. and Conradson carbon contents higher than 50%.

These treatments may be carried out rapidly within a period of a few hours with good yields of final pitch, e.g. greater than 75%.

At this stage of the operation, the proportion of $\beta$ resins of the initial pitch may be further increased, if desired, by the mild ageing of the material at temperatures of 350° to 400° C.

In converting the preferred pitches described above to foam the conditions may be selected as follows:

| | Broad range | Preferred range for pitch foams to be subsequently carbonised |
|---|---|---|
| Decomposition temperature | 120–210° C. | 155–210° C. |
| Decompression temperature | 110–220° C. | 170–220° C. |

Other conditions may be as previously described. The apparent density of the pitch foams is desirably from 0.1 to 0.3 with, as previously indicated, an open porosity preferably greater than 75%.

The pitch foams are converted to carbon or graphite foams by oxidation followed by carbonisation.

The oxidation of the pitch foams is designed to render the surface layer infusible so that the porous structure of the pitch foam is maintained in the subsequent treatments of carbonisation and graphitisation.

The maximum temperature at which the oxidation is carried out should not markedly exceed the temperature at which the pitch foam softens.

Thus, inthe case of pitches having a softening point of between 150° and 210° C., the oxidation temperature should not exceed 250° C. Above this temperature the oxidised layer becomes too thick with a resultant deterioration in the properties of the carbon foams. If the temperature is too low, the rate of oxidation may be insufficient and the pores may have a tendency to close during the carbonisation.

The oxidation is carried out in the presence of air or of a gaseous oxidising agent, e.g. oxygen or ozone. Preferably, a stream of gas is used, so that in addition to surface oxidation the products of the reaction are also removed.

The rate of flow of the gas may, in fact, exert a very considerable influence on the final mechanical properties of the carbon foams as well as on the yield. As previously indicated, the rate of flow should be sufficient to give surface oxidation as well as removing volatile products. The rate of flow, however, should not be too high because this might give too much oxidation, resulting in inferior mechanical properties of the foams. The rate of flow of oxidising gas such as air may vary between 50 and 200 liters per hour. Preferably the oxidation temperature is increased gradually, and the rate of increase should be sufficiently slow to permit of a complete treatment. A programme of temperature rises which is particularly satisfactory for the treatment of pitch foams according to the Invention may, for example, be as follows: between 0° and 120°/150° C., the temperature rise is rapid, e.g. of the order 250° to 350° C. per hour, and between 120°/150° and 250° C. the rise in temperature is slow, e.g. of the order 30° to 60° C. per hour.

This oxidation phase is important in the process according to the Invention, because it makes it possible to maintain the foam structure without the use of plastic materials as has been necessary in Prior Art.

The carbonisation of the foams is carried out by gradual heating under an inert atmosphere to a temperature of the order of 1,000° C. Non-oxidising gases such as nitrogen, argon, hydrogen or helium may be used preferably in the form of a stream of gas, which removes the volatile products of carbonisation. During the carbonisation, condensation of hydrocarbons begins at a temperature of 400° to 450° C. causing a gradual transformation of the structure so that the carbonised product contains at least 98% of carbon.

For this reason it is particularly important during the carbonisation treatment to control accurately the rises in temperature, avoiding a rapid evolution of volatile products, which could cause cracks in the foam.

Preferably, therefore, there is a stage of low temperature rise between 400° and 450° C., during which stage the pitch foam is converted into a mesophase. This phase of slow temperature rise produces orientation of the crystallites and increases the mechanical strength of the carbon foam. It also makes it possible to improve the yield of foam.

A particularly satisfactory programme of temperature rises may use a rapid rate of increase of temperature rise between 250° and 400° C. This rate may be between about 60° and 120° C. per hour. Between 400° and 450° C. a low rate of temperature rise is used, e.g. between 50° and 60° C. per hour, while between 450° and 1,000° C. the rate of temperature rise may be rapid, e.g. between about 300° and 600° C. per hour.

The rate of temperature rise may vary with the nature of the initial pitch. Thus, the higher the softening point of the pitch, the higher may be the rate and, consequently, the shorter will be the time of treatment.

The rate of flow of inert gas may be regulated and selected in such a way that the gas can entrain the various products of carbonisation so that the structure of the pores is not damaged. It is, preferably, between 5 and 150 liters per hour.

Carbon foams produced at 1,000° C. may be heated further to a high temperature, (e.g. between 2,000° and 2,500° C.). During this further heating the remaining small quantity of hydrogen in the foam is sunstantially completely eliminated.

Graphite foams are produced by a thermal treatment at a temperature higher than 2,500° C., also under an inert atmosphere. The carrier gas used during this treatment may be of the same type as that used for the carbonisation reaction. The process is usually carried out very rapidly for about 1 to 10 minutes.

The carbon foams thus prepared may have an apparent density which is preferably between 0.1 and 0.45 and an open porosity which is preferably between 70 and 95%. These foams are likely to have good mechanical properties, e.g. the resistance to compression may reach values of between 50 and 150 kg/cm$^2$.

These foams may be used in any of the applications known for existing foams, particularly as thermal insulators, as catalyst supports and as filters for corrosive products. Other uses based on the structural characteristics and mechanical properties of the foam will be apparent to those conversant with the Art.

The carbon foams can also be converted into activated carbon by controlled oxidation in known manner, thereby further increasing the range of potential uses.

The invention is illustrated by the following examples.

EXAMPLE 1

The pitch used was derived from the residue resulting from the steam cracking of a naphtha fraction. It had:
a KS softening point of 90° C.,
a density of 1.20,
viscosity:
  at 140° C.–50 Pa.s,
  at 160° C.–7 Pa.s.

This pitch was mixed with 1.9% of $OP_1$ and 5% by weight of talc, introduced into a stainless steel mould, the interior of which had been coated with a fluorocarbon product, and maintained under an initial pressure of 5 bars and at a temperature of 157° C. for 14 minutes until the decomposition of the porogenic agent was complete.

The temperature was then lowered to 110° C. and the pressure to 1.8 bars for 2 minutes, the speed of decompression being 5 liters per hour and the whole was allowed to stabilise for 5 minutes. The mould was then cooled by dipping it into water. After release from the mould, a pitch foam was obtained having an apparent density of 0.30, a total porosity of 75.2%, and an open porosity of 75%.

By modifying the nature of the pitch, the porogenic agent and also the conditions of treatment, as shown in Tables I and II below, pitch foams were obtained having the apparent density and the percentage of open porosity shown in the last two columns of the Table.

Except where otherwise stated, the conditions are identical to those shown in Example 1.

TABLE I

| Example No. | 2 | 3 | 4 | 5 | 6 | 7 | 8 | 9 | 10 | 11 |
|---|---|---|---|---|---|---|---|---|---|---|
| KS of pitch (°C.) | 90 | 120 | 154 | 177 | 90 | 120 | 154 | 154 | 154 | 195 |
| Nature of porogenic agent | $OP_1$ | $OP_1$ | $OP_1$ | AZM25 | AZCC | AZCC | BZM | BZM | $OP_1$ | AZM25 |
| % of porogenic agent | 1.9 | 2.2 | 2.9 | 2.9 | 6.0 | 3.0 | 1.9 | 2.35 | 7.0 | 2.9 |
| % talc | 3.5 | 3.75 | 5.2 | 6.2 | 6.0 | 3.6 | 3.8 | 4.6 | 7.8 | 6.2 |
| Decomposition temperature (°C.) | 157 | 155 | 150–160 | 195 | 135 | 136 | 180–190 | 190 | 160 | 195 |
| Duration (mins) | 14 | 10 | 17 | 20 | 12 | 12 | 17 | 22 | 30 | 10 |
| Initial pressure (bars) | 5 | 4 | 3 | 4 | 4 | 4 | 4 | 5 | 3 | 4.2 |
| Decompression temperature (°C.) | 110 | 145 | 170 | 195 | 110 | 145 | 180 | 180 | 170 | 215 |
| Final Pressure (bars) | 1.8 | 1.4 | 1.4 | 1.8 | 0.4 | 0.4 | 1 | 2 | 1.4 | 2.2 |
| Time of decompression (mins) | 2 | 6 | 8 | 60 | 8 | 8 | 2 | 2 | 35 | 55 |
| Time of stabilisation (mins) | 5 | 5 | 5 | 10 | 7 | 7 | 6 | 7 | 10 | 5 |
| Apparent density (g/cm$^3$) | 0.3 | 0.35 | 0.25 | 0.20 | 0.20 | 0.35 | 0.35 | 0.30 | 0.15 | 0.20 |

TABLE I-continued

| Example No. | 2 | 3 | 4 | 5 | 6 | 7 | 8 | 9 | 10 | 11 |
|---|---|---|---|---|---|---|---|---|---|---|
| % total porosity | 75.2 | 72.0 | 79.3 | 83.5 | 83.5 | 71.0 | 72.0 | 80.0 | 87.6 | 83.5 |

In all examples the open porosity was the same as the total porosity.

TABLE II

| Example No. | 12 | 13 | 14 | 15 | 16 | 17 | 18 | 19 | 20 | 21 | 22 |
|---|---|---|---|---|---|---|---|---|---|---|---|
| KS of pitch (°C.) | 154 | 154 | 154 | 90 | 154 | 154 | 177 | 154 | 154 | 154 | 154 |
| Nature of porogenic agent | $OP_1$ | $OP_1$ | $OP_1$ | AZCC | BZM | BZM | AZM25 | $OP_1$ | $OP_1$ | $OP_1$ | $OP_1$ |
| % of porogenic agent | 10 | 2.8 | 9.2 | 3 | 2.45 | 2.35 | 2.9 | 4.2 | 2.8 | 4.2 | 4.2 |
| Nature of additive | Talc | Talc | Bentonite | Bentonite | — | Talc | Talc | Active Carbon | Talc | Talc + Bentonite | Talc + active carbon |
| % of additive | 10.7 | 5 | 6.9 | 3.6 | 0 | 4.6 | 6.2 | 6.1 | 5.0 | 5.0 | 5.0 |
| Decomposition temperature (°C.) | 160 | 160 | 155 | 136 | 180–190 | 180–190 | 190–200 | 156 | 156 | 160 | 160 |
| Duration (mins) | 30 | 50 | 25 | 8 | 20 | 10 | 13 | 12 | 12 | 15 | 15 |
| Initial Pressure (bars) | 4 | 3 | 3 | 4 | 0.5 | 5 | 4 | 10 | 2 | 3 | 3 |
| Decompression temperature (°C.) | 172 | 170 | 170 | 110 | 175 | 180 | 195 | 170 | 170 | 173 | 170 |
| Final pressure (bars) | 1 | 1.4 | 1.4 | 0.4 | 0 | 2 | 1.4 | 1.4 | 1.4 | 1.4 | 1.4 |
| Decompression time (mins) | 30 | 35 | 20 | 1 | 3 | 2 | 25 | 30 | 20 | 20 | 20 |
| Stabilisation time (mins) | 5 | 10 | 5 | 3 | 5 | 6 | 5 | 5 | 5 | 5 | 5 |
| Apparent density (g/cm³) | 0.10 | 0.25 | 0.125 | 0.35 | 0.27 | 0.4 | 0.20 | 0.20 | 0.25 | 0.20 | 0.20 |
| % total porosity | 91.7 | 79 | 90 | 71 | 78 | 67 | 83.5 | 83.5 | 79.3 | 83.5 | 83.5 |

In all examples the open porosity was the same as the total porosity.

The pitches used in the Examples described in Tables I and II had the properties shown in Table III.

TABLE III

| | Properties of pitches | | |
|---|---|---|---|
| KS of pitch | Density | Viscosity | |
| 90° C. | 1.20 | 140° C.: 50 Pa.s | 160° C.: 7 Pa.s |
| 120° C. | 1.21. | 140° C.: 3000 Pa.s | 150° C.: 700 Pa.s |
| 154° C. | 1.21. | 160° C.: 15000 Pa.s | 180° C.: 1500 Pa.s |
| 177° C. | 1.22 | 190° C.: 9000 Pa.s | 200° C.: 1900 pa.s |
| 195° C. | 1.23 | 200° C.: 6000 Pa.s | 220° C.: 600 Pa.s |

EXAMPLE 23

A coal tar pitch produced by the atmospheric distillation of tar had the following properties:
KS softening point: 83°–84° C.
Density at 20° C.: 1.30
Viscosities at 130° C.: 50 Pa.s
  at 140° C.: 15 Pa.s
  at 150° C.; 4.5 Pa.s This pitch was mixed with 2.9% of $OP_1$, introduced into a mould and maintained under an initial pressure of 4 bars and at a temperature of 156° C. for 10 minutes until the complete decomposition of the porogenic agent. The temperature was then lowered to 100° C. and the pressure to 1.4 bars for 2 minutes and the whole was allowed to stabilise for 5 minutes. The mould was then cooled. After mould release, a thick foam was obtained having an apparent density of 0.26 and a total porosity of 74%, which was entirely open porosity.

EXAMPLE 24

An asphalt pitch had the following properties:
KS softening point: 175° C.
Viscosities at 200° C.: 2000 Pa.s
  at 210° C.: 700 Pa.s This pitch was mixed with 3.2% of AZM2S, introduced into a mould and maintained under an initial pressure of 5 bars and a temperature of 195° C. for 40 minutes until the complete decomposition of the porogenic agent.

The pressure was then reduced gradually to 1.6 bars over a period of 10 minutes. The mould was then cooled. After mould release, an asphalt pitch foam was obtained having an apparent density of 0.20 and a total porosity of 83%, which was entirely open porosity.

EXAMPLE 25

The pitch used was derived from the residue resulting from the steam cracking of a naphtha fraction and had the following properties:

| | |
|---|---|
| KS softening point | 155° C. |
| percentage of β resins | 32 |
| Conradson carbon | 60 |
| density | 1.21 |

This pitch was mixed with 2.4% by weight of a porogenic agent, azodicarbonamide, having a decomposition temperature of 200° C. and 5% by weight of talc. The whole was introduced into a stainless steel mould, the interior of which was coated with a layer of fluorocarbon product.

The mould was brought to a temperature of 206° C. under a pressure of 5 bars. The decomposition of the porogenic agent was complete after 9 minutes, at which point the temperature was lowered to 176° C. and the pressure to 2 bars. A pitch foam having an apparent density of 0.4 and a total porosity of 67% was obtained. The temperature and the pressure are shown in the graph of the drawing in which the abscissa indicates the time in minutes (min), and the ordonates indicate the temperatures (T) in degrees Centigrade (°C.) and pressures (P) in bars (b), respectively.

Table IV below illustrates other examples of manufacture of pitch foams according to the Invention.

Table IV shows, successively, the pitch treated, the porogenic agent and its proportion by weight in the mixture, the additive and its proportion by weight, the decomposition temperature, the initial pressure, the decompression temperature, the final pressure, the apparent density and the total porosity of the foam.

The conditions of operation were otherwise similar to those shown in Example 25.

gen flowing at a rate of 120 liters per hour, and the heating was continued up to 1,000° C. with a rate of temperature rise of 1° C. per minute (60° C. per hour) between 250° and 420° C., of 0.5° C. per minute (30° C. per hour) between 420° and 450° C., and 5° C. per minute (300° C. per hour) between 450° and 1,000° C.

Samples were taken at 250° C., 500° C. and 1,000° C., the properties of which were as follows:

TABLE IV

| | PREPARATION OF PITCH FOAMS | | | | | |
|---|---|---|---|---|---|---|
| Example | 26 | 27 | 28 | 29 | 30 | 31 |
| Pitch used | KS softening point: 155 % β resins: 32 % Conradson carbon: 60 density: 1.21 | as example 26 | as example 26 | as example 26 | as example 26 | as example 26 |
| Porogenic agent | 1.9 AZD | 1.9 OP$_1$ | 2.8 OP$_1$ | 4.2 OP$_1$ | 8 OP$_1$ | 9.2 OP$_1$ |
| Additive % | 3.8 | 3.8 talc | 5.0 talc | 6.1 talc | 7.7 talc | 6.9 talc |
| Decomposition temperature (°C.) | 190 | 155 | 155 | 155 | 155 | 155 |
| Initial pressure (bars) | 4 | 4 | 3 | 3 | 3 | 3 |
| Decompression temperature (°C.) | 180 | 175 | 170 | 170 | 168 | 170 |
| Final pressure (bars) | 1 | 1.4 | 1.4 | 1.4 | 1.4 | 1.4 |
| Apparent density | 0.30 | 0.30 | 0.20 | 0.15 | 0.10 | 0.08 |
| Total porosity % | 75 | 75 | 83.5 | 87.5 | 92 | 93.5 |

AZD = Azodicarbonamide (or azobisformamide)
OP$_1$ = p,p' oxybisbenzenesulphonylhydrazide

EXAMPLE 32

The pitch used was derived from a steam cracking residue. It had a KS softening point of 155° C. and the other properties indicated in Example 25.

This pitch was mixed with 4.2% by weight of p,p'-oxybisbenzenesulphonylhydrazide (OP$_1$) and 6.1% by weight of talc. The whole was introduced into a stainless steel mould, the interior of which was coated with a fluorocarbon product.

The mould was brought to a temperature of 180° C. under a pressure of 3 bars, over a period of 10 minutes. The temperature was then lowered to 175° C. and the pressure to 1 bar. A pitch foam was obtained having an apparent density of 0.20, a real density of 1.22 and a pyknometric density of 1.21.

The open porosity was 83.5%.

Preparation of Carbon Foam

EXAMPLE 33

The pitch foam of Example 32 was heated up to 250° C. under a rate of flow of air of 120 liters per hour with a rate of temperature rise of 0.5° C. per minute (30° C. per hour). Above 250° C. the gas was changed to nitro-

TABLE V

| | PROPERTIES OF PRODUCTS OBTAINED | | | | | |
|---|---|---|---|---|---|---|
| Foams | ad | pd | % total porosity | % open porosity | % loss in weight | % loss in volume |
| Pitch foam | 0.20 | 1.21 | 83.5 | 83.5 | — | — |
| After treatment at 250° C. | 0.24 | 1.31 | — | 80.2 | +3.6 (gain) | −11.9 |
| After treatment at 500° C. | 0.25 | 1.35 | — | 80.6 | −11.8 | −27.5 |
| After treatment at 1,000° C. | 0.35 | 1.75 | — | 80.2 | −17.4 | −42 |

Table VI below illustrates the preparation of carbon foams according to the process of the Invention from pitch foams prepared in a manner similar to that described in previous Examples.

Table VI shows the properties of the pitch foams, the carbonisation conditions, and properties of the carbon foams obtained, i.e. the apparent density, the pyknometric density, the total porosity in % and the open porosity in %.

The conditions of operation were otherwise similar to those given for Example 33.

TABLE VI

| | Initial pitch foam | | | | | Carbonisation (1000° C.) | | | | | Properties of the carbon foam | | |
|---|---|---|---|---|---|---|---|---|---|---|---|---|---|
| Example No. | KS of pitch | ad | pd | % total porosity | % open porosity | Final temperature °C. | Rate of flow of air (l/hr) | Rate of flow of N$_2$ (l/hr) | yield % wt | ad | pd | % open porosity | % total porosity | resistance to compression kg/cm$^2$ |
| 34 | 154 | 0.15 | 1.21 | 87.5 | 87.5 | 1000 | 20 | 8 | 76 | 0.25 | 1.74 | 85.5 | ≧85.5 | 70 |
| 35 | 154 | 0.20 | 1.21 | 83.5 | 83.5 | 1000 | 100 | 25 | 80 | 0.35 | 1.75 | 80.0 | ≧80.0 | 85 |
| 36 | 154 | 0.30 | 1.21 | 75.0 | 75.0 | 1000 | 120 | 120 | 81 | 0.44 | 1.75 | 75.0 | ≧75.0 | 140 |
| 37 | 177 | 0.20 | 1.22 | 83.5 | 83.5 | 1000 | 125 | 125 | 82 | 0.26 | 1.73 | 85.0 | ≧85.0 | 80 |
| 38 | 177 | 0.15 | 1.22 | 87.5 | 87.5 | 1000 | 125 | 125 | 82 | 0.18 | 1.73 | 89.5 | ≧89.5 | 50 |
| 39 | 154 | 0.23 | 1.21 | 81.0 | 81.0 | 1000 | 125 | 125 | 80 | 0.44 | 1.75 | 75.0 | ≧75.0 | 130 |
| 40 | 154 | 0.25 | 1.21 | 79.5 | 79.5 | 1000 | 125 | 125 | 80 | 0.42 | 1.75 | 76.0 | ≧76.0 | 120 |
| 41 | 154 | 0.125 | 1.21 | 90.0 | 90.0 | 1000 | 125 | 125 | 81 | 0.20 | 1.75 | 89.0 | ≧89.0 | 65 |

TABLE VI-continued

| Example No. | Initial pitch foam ||||| Carbonisation (1000° C.) ||||| Properties of the carbon foam |||
|---|---|---|---|---|---|---|---|---|---|---|---|---|---|
| | KS of pitch | ad | pd | % total porosity | % open porosity | Final temperature °C. | Rate of flow of air (1/hr) | Rate of flow of N₂ (1/hr) | yield % wt | ad | pd | % open porosity | % total porosity | resistance to compression kg/cm² |
| 42 | 195 | 0.20 | 1.23 | 83.5 | 83.5 | 1000 | 125 | 125 | 85 | 0.25 | 1.73 | 85.5 | ≧85.5 | 60 |

We claim:

1. A process for the production of pitch foams in which a pitch is expanded at elevated temperature in a mould by means of a porogenic agent characterised in that a pitch having a KS softening point of from 150° to 210° C., a Conradson carbon content of more than 50%, and a β resin content of from 5 to 40% and a porogenic agent are introduced into a mold that the initial pressure is between 1 to 10 bars wherein the applied external pressure is higher than the internal pressure which would normally exist within the pitch at the temperature of operation, and that after the decomposition of the porogenic agent, the external pressure is lowered to a decompression pressure to expand the pitch in the mold to a density of from 0.05 to 0.6 and an open porosity of greater than 75% during a decompression stage, the decompression pressure being between 0 and 2 bars, the pitch having a viscosity of from 1,000 to 10,000 Pa.s during the decompression stage, and that thereafter the expanded pitch foam is released from the mold.

2. A process as claimed in claim 1, characterised in that the porogenic agent has a decomposition temperature of between 120° and 210° C.

3. A process as claimed in any of claims 1, characterised in that the decompression temperature is between 110° and 220° C.

4. A process as claimed in any of claims 20 or 21 characterised in that the porogenic agent is selected from the group consisting of:
p,p'-oxybisbenzenesulphonylhydrazide,
azodicarbonamide (or azobisformamide),
azo-1,1'-cyano-1cyclohexane,
azobisisobutyronitrile,
diazoaminobenzene,
N,N'-dimethyl N,N'-dinitrosoterephthalimde,
N,N'-dinitrosopantamethylenetetramine,
benzenesulphonyl hydrazide,
4-toluenesulphonyl hydrazide,
Diphenylsulphone-3,3'-disulphonyl hydrazide,
p-toluene sulphonyl semicarbazide,
5-phenyl tetrazole,
diphenoxy-4,4-disulphohydrazide,
trihydrazinotriazine,
sodium bicarbonate, pentane,
chlorinated and/or fluorinated derivatives of methane and water.

5. A process as claimed in claim 1 characterised in that the decomposition temperature is from 155° to 210° C., and the decompression temperature is from 170° to 220° C.

* * * * *

UNITED STATES PATENT AND TRADEMARK OFFICE
CERTIFICATE OF CORRECTION

PATENT NO. : 4,276,246
DATED : June 30, 1981
INVENTOR(S) : ALBERT BONZOM, ALAIN PIERRE CREPAUX and
ANNE MARIE EUGENIE JEANNE MOUTARD It is certified that error appears in the above—identified patent and that said Letters Patent is hereby corrected as shown below:

In the Abstract, six lines from the bottom, change "Certain foams" to --Certain of the foams--;

Column 1, line 28, change "folowing" to --following--;

Column 4, line 67, change "of" (second occurrence) to --or--;

Column 7, line 52, change "sunstantially" to --substantially--;

Column 8, Table I - Example No. 6, Decomposition temperature (°C.) change "135" to --136--;

Column 14, Claim 3, line 1, change "any of claims" to --Claim--;

Claim 4, line 1, change "any of claims 20 or 21" to --Claim 1--;

line 19, change "1cyclohexane" to --1-cyclohexane--;

line 22, change "dinitrosoterephthalimde" to --dinitrosoterephthalimide--.

Signed and Sealed this

Seventeenth Day of November 1981

[SEAL]

Attest:

GERALD J. MOSSINGHOFF

Attesting Officer    Commissioner of Patents and Trademarks